US 6,662,364 B1

(12) United States Patent
Burrows et al.

(10) Patent No.: US 6,662,364 B1
(45) Date of Patent: Dec. 9, 2003

(54) SYSTEM AND METHOD FOR REDUCING SYNCHRONIZATION OVERHEAD IN MULTITHREADED CODE

(75) Inventors: Michael Burrows, Palo Alto, CA (US); Mark Thierry Vandervoorde, Sunnyvale, CA (US); Sanjay Ghemawat, Mountain View, CA (US)

(73) Assignee: Hewlett-Packard Company, L.P., Houston, TX (US)

( * ) Notice: Subject to any disclaimer, the term of this patent is extended or adjusted under 35 U.S.C. 154(b) by 0 days.

(21) Appl. No.: 09/434,831

(22) Filed: Nov. 5, 1999

(51) Int. Cl.$^7$ ................................................ G06F 9/00
(52) U.S. Cl. ........................ 718/102; 718/100; 718/104
(58) Field of Search ................................. 709/100–108, 709/400

(56) References Cited

U.S. PATENT DOCUMENTS

| 5,274,809 A | * | 12/1993 | Iwasaki et al. ............. 709/104 |
| 5,630,128 A | * | 5/1997 | Farrell et al. ................ 709/103 |
| 5,862,376 A | * | 1/1999 | Steele et al. ................. 709/107 |
| 6,026,427 A | * | 2/2000 | Nishihara et al. ........... 709/106 |
| 6,029,190 A | * | 2/2000 | Oliver ......................... 709/107 |
| 6,108,754 A | * | 8/2000 | Lindholm .................... 711/122 |
| 6,167,424 A | * | 12/2000 | Bak et al. .................... 709/100 |
| 6,199,094 B1 | * | 3/2001 | Presler-Marshall .......... 709/104 |
| 6,223,204 B1 | * | 4/2001 | Tucker ........................ 709/103 |
| 6,260,058 B1 | * | 7/2001 | Hoenninger et al. ......... 709/107 |
| 6,289,369 B1 | * | 9/2001 | Sundaresan .................. 709/103 |
| 6,295,602 B1 | * | 9/2001 | Weissman et al. ............. 713/1 |
| 6,345,313 B1 | * | 2/2002 | Lindholm .................... 709/315 |
| 6,401,110 B1 | * | 6/2002 | Freitas et al. ................ 709/104 |
| 6,438,573 B1 | * | 8/2002 | Nilsen ......................... 709/100 |

* cited by examiner

*Primary Examiner*—Majid A. Banankhah
*Assistant Examiner*—Syed J Ali

(57) ABSTRACT

A system and method for implementing mutual exclusion locks (mutexes) is provided. Mutexes of the present invention designate whether they are to be synchronized using fast nonatomic load/store sequences or, alternatively, expensive atomic hardware instructions. When a requesting thread requests a target mutex, the target mutex is synchronized using the method designated by the target mutex. In some embodiments, the designated synchronization method may be changed to the atomic method when the requesting thread is not the thread associated with the target mutex. In other embodiments, the designated synchronization method may be determined by a heuristic function. For example, the synchronization method may be changed to the atomic method when a mutex request counter, which penalizes thread changes, underflows. Other possible heuristic functions may consider factors such as whether the recursion overflow bit of the target mutex has been set, the percentage of mutexes, created by a predetermined call state, that have been converted to the atomic method, and/or the overall percentage of mutexes in the system that have been converted to the atomic method.

49 Claims, 6 Drawing Sheets

SYSTEM AND METHOD FOR REDUCING SYNCHRONIZATION OVERHEAD IN MULTITHREADED CODE

The present invention relates generally to a system and method for implementing mutual exclusion locks.

BACKGROUND OF THE INVENTION

The advent of operating systems that support multi-threaded languages such as Java has vastly improved the utility of computers. Multithreaded environments present special problems, however, because it is possible for threads to compete for the same resources. Such resources include sections of code, data structures, and system peripherals. If resources are left unprotected, many undesirable states are possible. For example, a race condition, in which multi-threaded code becomes dependent upon the order of completion of two or more independent activities, may arise. Race conditions are possible in any program where independent threads access the same resources in an unpredictable order. See, e.g., Cohen & Woodring, 1998, WIN32 MULTI-THREADED PROGRAMMING, O'Reilly, New York. In general, any failure in a multithreaded environment to ensure that a resource, such as a data structure, is not being operated on by a thread may result in other threads seeing data that is in an inconsistent, intermediate state. To prevent such undesirable states, functionality is typically provided in multithreaded environments to ensure that each resource is accessed by, at most, a single thread at any given instance.

One method that is used to ensure that multiple threads do not simultaneously claim a particular resource is to protect the resource with a mutual exclusion lock ("mutex"). Typically, each resource is protected with a unique mutex. At most one thread may hold a given mutex at any time, so if a programmer arranges to access a resource only while holding a mutex, the programmer is guaranteed that at most one thread accesses the resource at any given time. The process by which a requesting thread verifies that no other thread is holding a mutex is known as synchronization.

Synchronization is accomplished using acquire and release operations. In the acquire operation, the requesting thread claims exclusive ownership of a mutex, or the requesting thread is blocked until exclusive ownership of the mutex is available. In the release operation, the requesting thread releases ownership of the resource. These acquire and release operations are normally implemented using hardware provided atomic machine instructions such as test-and-set, atomic compare-and-swap, or load-locked/store conditional. Such atomic machine instructions require a large number of central processing unit cycles to execute because they necessarily involve memory ordering operations visible outside a single processor.

Because of the expensive nature of atomic machine instructions, techniques have been developed to avoid their use on uniprocessor computers, where each thread runs by itself until the processor receives an interrupt from an external source. See e.g., Moss and Kohler, Proceedings of European Conference on Object-Oriented Programming, Paris, France, 171–180, 1987; Lecture Notes on Computer Science, ed. Bezivin et al., Springer-Verlag, 276, 1986. Central to these techniques is the requirement that no thread be interrupted while in an atomic sequence. Such a requirement may be implemented directly in the operating system or in other parts of the system. Thus, when the operating system wishes to interrupt the running thread, the operating system will query whether the running thread is in an atomic sequence. If the running thread is in an atomic sequence, the running thread will be either backed up or pushed forward using an interpreter so that it is no longer in the atomic sequence. Once the running thread is outside of an atomic sequence, it can be interrupted. After the running thread has been interrupted, another thread can operate on the mutex. Such prior art techniques work well in a uniprocessor environment because the only way for a requesting thread to start running is for the currently-running thread to be interrupted. Thus all that is required to guarantee atomicity in a uniprocessor environment is for threads to not be interrupted during an atomic sequence. However, such techniques do not work in multiprocessor environments because it is possible for more than one thread to run simultaneously.

Another prior art technique that has been used to minimize the cost of synchronization is to provide equivalent thread safe and non-thread safe versions of routines, as is done in various UNIX systems, such as Compaq Tru64 UNIX. A careful programmer can control the amount of synchronization in code by selecting thread safe routines only when they are required. The problem with such an approach is that it is difficult to predict in advance whether thread safety will be needed in future versions of code. Furthermore, reliance on the intuition of a programmer to identify what objects should be thread safe and what objects do not need to be made thread safe is time consuming and error prone. A cautious programmer must always assume that thread safety may be required at some time in the future, even if it is not needed now.

Yet another prior art technique used to reduce synchronization costs are runtime systems, such as that in Compaq Tru64 UNIX, that have two different code sequences for mutex operations, one for single-threaded programs and the other for multithreaded programs. The decision of whether to use single-threaded or multithreaded code sequences may be made at link time, load time, or while the program is running. However, this technique does not minimize the cost of atomic synchronization once a commitment to multi-threaded code is made because there is no attempt to avoid atomic instructions in the multithreaded versions of the code. Thus, when the multithreaded runtime system is chosen over the single-threaded runtime system, expensive atomic synchronization operations are still required.

Accordingly, it is an object of the present invention to provide a system and method for reducing the costs of synchronization in a multithreaded environment regardless of the number of processors in the environment and without any requirement that the programmer pick between thread safe and thread unsafe versions of code.

SUMMARY OF THE INVENTION

A system and method is provided for controlling a request to acquire a target mutex. The target mutex is capable of designating whether it may be synchronized using a fast nonatomic load/store sequence or expensive atomic hardware instructions. The method by which a target mutex is synchronized, in response to a request by a requesting thread, depends on whether the target mutex has designated the fast nonatomic synchronization sequence or the expensive atomic synchronization sequence. When using the fast nonatomic synchronization sequence, the target mutex can further designate a thread that is currently associated with the mutex.

Each mutex has an "associated" thread, even when the mutex is not held by any thread. The thread associated with a mutex can synchronize with the mutex using the fast nonatomic synchronization sequence, while any other thread must use a more complex procedure for synchronizing with the mutex.

When the target mutex has designated the fast synchronization sequence, a determination is made as to whether the requesting thread is the thread associated with the target mutex. If the requesting thread is the thread that is associated with the target mutex, the request to acquire the target mutex is granted without atomic hardware operations. However, if the requesting thread is not the thread associated with the target mutex, a verification procedure is executed to ensure that no thread is operating on the target mutex.

When the target mutex has designated the expensive atomic synchronization sequence, the mutex is synchronized using atomic machine instructions to ensure that no thread is operating on the target mutex. Then, the request to acquire the target mutex has been completed.

In one embodiment of the present invention, the verification procedure in the fast synchronization sequence may comprise forcing the target mutex to designate the expensive synchronization method and therefore defaulting to synchronization using the expensive technique. In another embodiment of the present invention, the verification procedure involves execution of a heuristic function to determine whether to set the mutex to the expensive synchronization method or to associate the requesting thread with the target mutex. This heuristic function may, for example, use a mutex request counter. The counter is incremented each time the mutex is acquired, and decremented by some constant each time the thread associated with the mutex is changed. When the counter is above a threshold, the requesting thread is associated with the target mutex. When the counter is below the threshold, the expensive synchronization technique is executed.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The present invention provides a system and method for reducing mutex synchronization overhead. In a preferred embodiment, each mutex M in the present invention is capable of designating whether it should be synchronized by fast nonatomic sequences, H(M)=0, or by conventional expensive atomic hardware instructions, H(M)=1. The synchronization method designated by each mutex M may change during the lifetime of the mutex based upon a set of criteria such as a heuristic function. Synchronization method 0 is tuned for the case where the mutex is to be acquired exclusively, or almost exclusively, by one thread. Synchronization method 1 is a standard synchronization method that uses expensive atomic machine instructions. When synchronization method 0 is used, significantly fewer central processing unit cycles are consumed because expensive atomic machine instructions are avoided. In an alternative embodiment, each mutex M can only be in the state H(M)=0. In this alternative embodiment, each mutex M is synchronized by fast nonatomic sequences rather than conventional expensive atomic hardware instructions.

Figure 1:
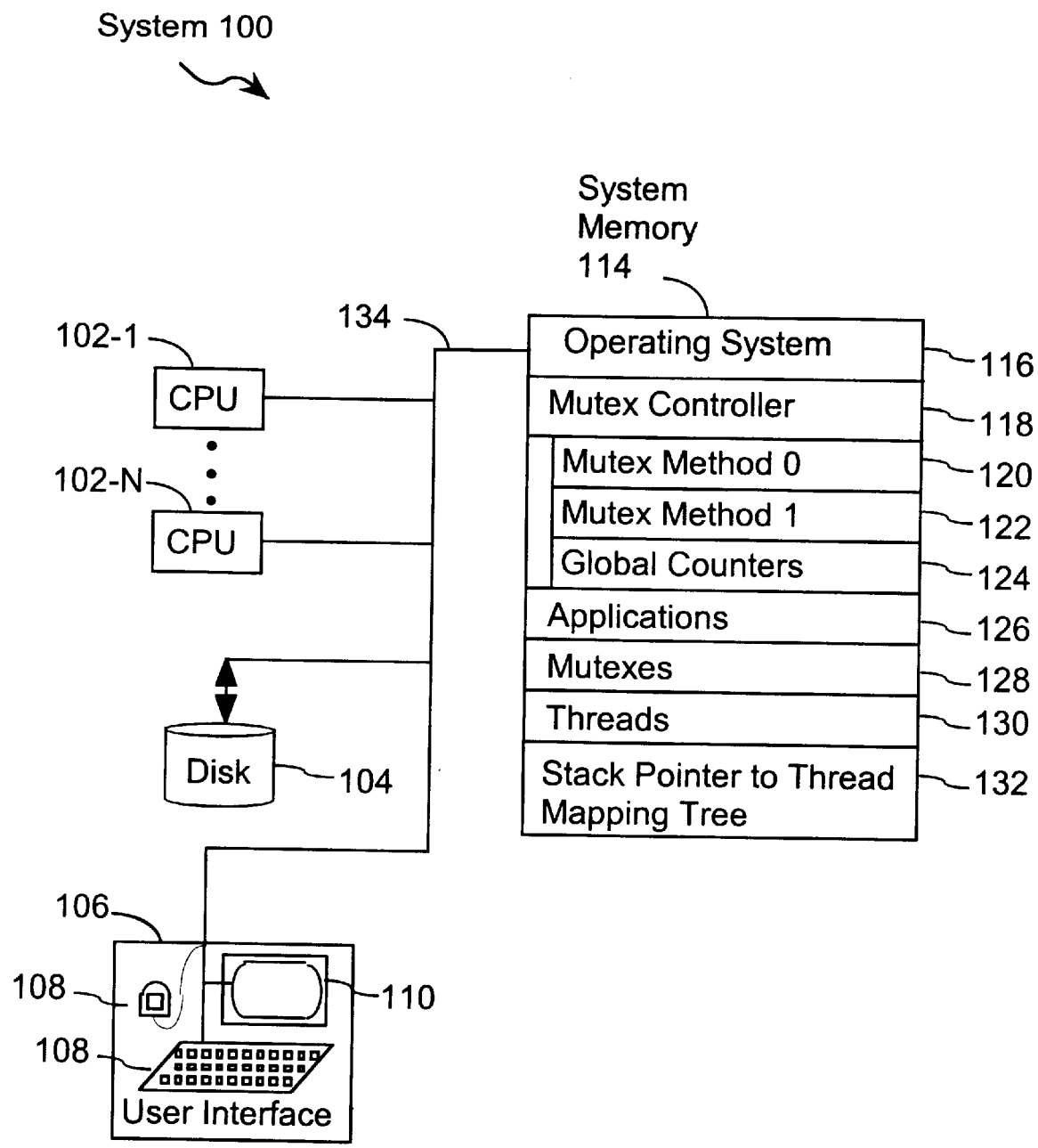
FIG. 1 is a block diagram of a system for providing access to a mutex that may be synchronized by a first synchronization method or a second synchronization method in accordance with the present invention.

FIG. 1 shows a system, such as system 100, for operating on (i.e., acquiring) a mutex that may be synchronized by a first method or a second method in accordance with the present invention. The system preferably includes:

- at least one central processing unit 102;
- a main non-volatile storage unit 104, preferably a hard disk drive, for storing one or components of system memory 114, including applications 126;
- a system memory unit 114, preferably including both high speed random-access memory (RAM) and read-only memory (ROM), for storing; system control programs, data, and application programs loaded from disk 104;
- one or more internal buses 134 for interconnecting the aforementioned elements of the system.

In some embodiments, system 100 further includes a user interface 106 that has one or more input devices 108 and a display 110; and The operation of system 100 is controlled primarily by the operating system 116 that is executed by the system's one or more central processing units 102. The operating system may be stored in system memory 114. In a typical implementation, the system memory 114 includes:

- operating system 116;
- a mutex controller 118, including mutex synchronization method 0 (120) and 1 (122), and global counters 124;
- one or more applications 126;
- one or more mutexes 128, each including a flag that indicates which of two synchronization methods, 0 and 1, are to be used to synchronize the mutex;
- one or more thread data structures 130, representing threads executed by system 100; and
- a stack pointer to thread mapping tree 132.

One of skill in the art will appreciate that the mutex controller may be a component of operating system 116, of one or more of applications 126, or of one or more threads 130.

Reducing Synchronization Overhead

The operation of system 100 will now be described with reference to FIGS. 2–6.

Each mutex M has an "associated" thread, designated Tassc(M), even when the mutex is not held by any thread. The thread associated with a mutex can synchronize with the mutex using the fast nonatomic synchronization sequence of the present invention, while any other thread must use a more complex and time consuming procedure for synchronizing with the mutex. This will be described in more detail below.

Figure 2:
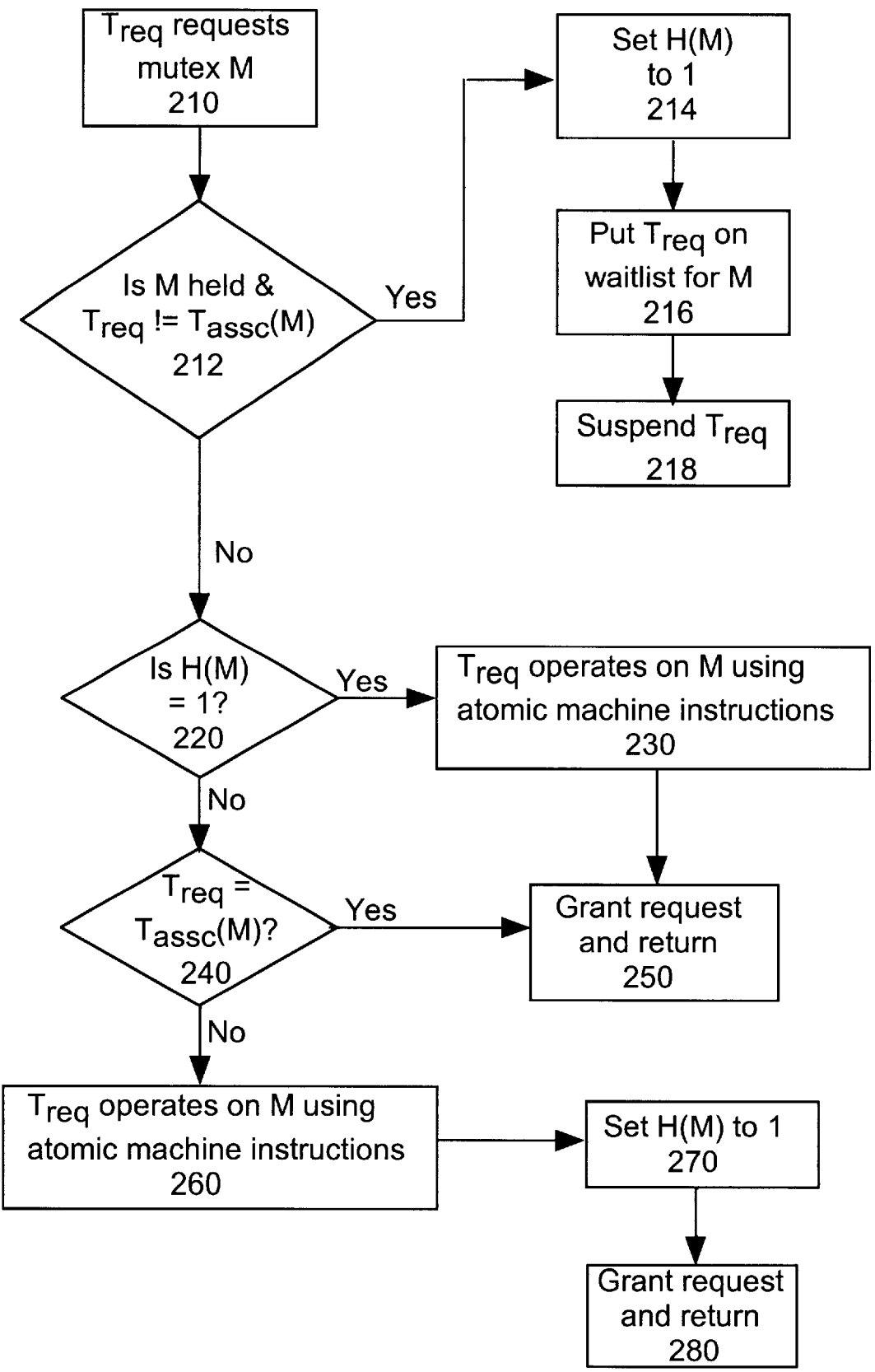
FIG. 2 is a flow chart of a method for acquiring a target mutex in accordance to one embodiment of the present invention.

Referring to FIG. 2, when a requesting thread, $T_{req}$, makes a request to acquire mutex M (210), $T_{req}$ firsts tests (212) whether M is held, and whether $T_{req}$ is the thread currently associated with M, designated $T_{assc}(M)$. The condition of mutex M, whether held or not, is recorded in mutex M itself. When M is held and $T_{req}$ is not $T_{assc}$ (212-Yes), the mutex synchronization method, H(M), is set to 1 (214) and $T_{req}$ is placed on a waiter's list for mutex M (216) and execution of $T_{req}$ is suspended (218). When $T_{req}$ resumes operation, after the thread holding mutex M releases the mutex, its operation will resume at step 210. It will be appreciated that other embodiments of the present invention, which are described in subsequent figures, include steps 212–218 although not shown. Further, it will be appreciated that step 214 requires assurance that mutex M is not being operated on by $T_{assc}$. Such assurance may be obtained by using expensive atomic instructions or by use of a supervisor mutex mechanism such as the embodiment described in FIG. 5. In preferred embodiments of the present invention, step 214, setting H(M) to 1, will not be executed until $T_{req}$ has suspended $T_{assc}(M)$. In such embodiments, therefore, step 214 will not be executed until after step 218.

If mutex M is not held or $T_{req}$ is $T_{assc}$, H(M) is queried to determine whether mutex synchronization method 0 or 1 should be used to operate on mutex M (220). When H(M)=1 (220-Yes), a conventional synchronization method, which uses atomic machine instructions, is used to synchronize mutex M (230) before granting the request to acquire mutex M (250). It is noted here that whenever a mutex acquisition request is granted, the data structure of the mutex is updated to indicate the new state of the mutex. For instance, in some systems this is accomplished by incrementing a "recursive request counter" field in the mutex data structure. Other updates to the mutex data structure may be made as well, depending on the requirements of the operating system and/or programming language.

When H(M)=0 (220-No), synchronization method 0 is used to synchronize mutex M. In the embodiment shown in FIG. 2, synchronization method 0 comprises determining whether $T_{req}$ is associated with mutex M (240). When $T_{req}$ is associated with mutex M ($T_{req}=T_{assc}(M)$) (240-Yes), the request to acquire mutex M is granted. When $T_{req}$ is not associated with mutex M, (240-No), atomic machine instructions are used to synchronize mutex M (260), the mutex synchronization bit H(M) of mutex M is set to 1 (270), and the request to acquire mutex M is granted (280).

Figure 3:
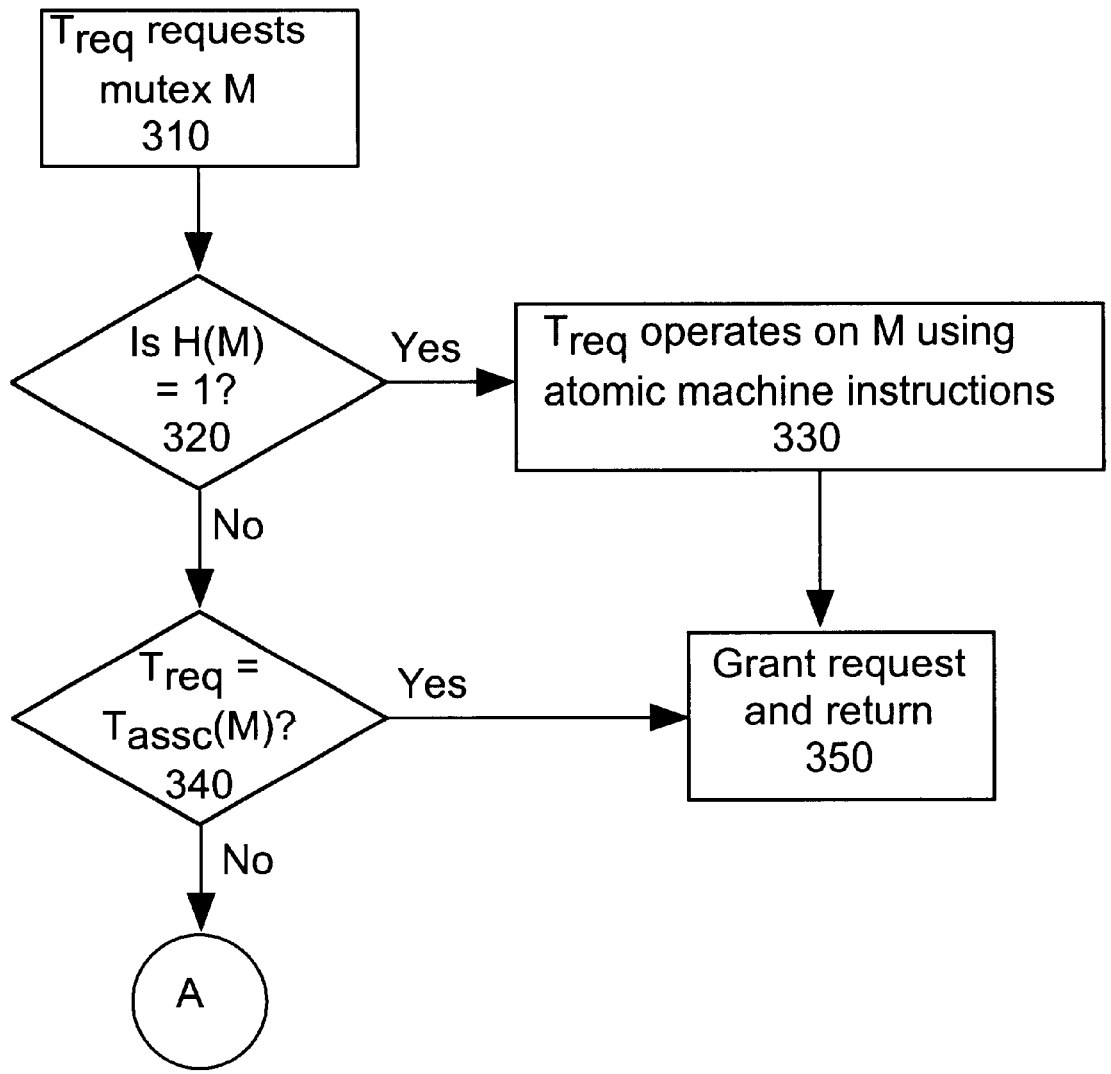
FIG. 3 is a flow chart of a method for acquiring a target mutex in accordance to another embodiment of the present invention.

Another embodiment of the present invention is shown in FIG. 3. In the embodiments shown in FIGS. 3, 4 and 5, it is assumed that at the time of the mutex synchronization request, the mutex is not held by a different thread than the requesting thread. More particularly, each of these flow charts implicitly includes steps 212–218 of FIG. 2, for handling the situation where the mutex is held by a different thread than the requesting thread.

Figure 5:
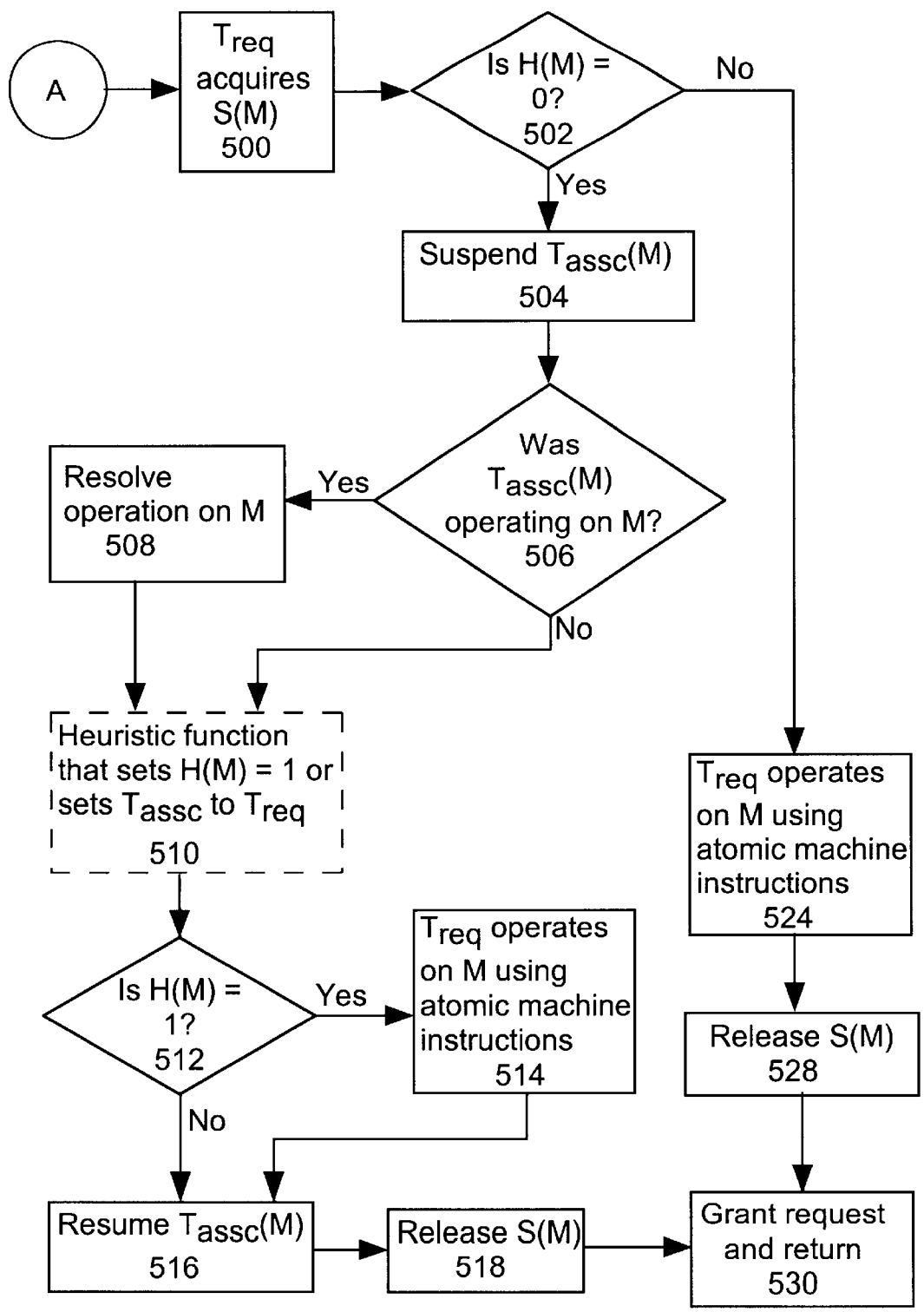
FIG. 5 is a flow chart of a method for using a heuristic function to choose between setting a mutex to the second synchronization method and associating a requesting thread with a mutex, in accordance with various embodiments of,the present invention.

In FIG. 3, when a requesting thread, $T_{req}$, makes a request to acquire mutex M (310), the mutex synchronization bit of mutex M, H(M), is queried to determine whether mutex synchronization method 0 or 1 should be used (320). When H(M)=1, (320-Yes), a conventional synchronization method, which uses atomic machine instructions, is used to synchronize mutex M (330) before granting and returning the request to hold mutex M (350). When H(M)=0 (320-No), synchronization method 0 is used to synchronize mutex M. In this embodiment, synchronization method 0 comprises determining whether $T_{req}$ is associated with the target mutex (340). When $T_{req}$ is associated with mutex M (340-Yes), the request to hold mutex M is granted and returns. When $T_{req}$ is not associated with mutex M, (340-No), the heuristic method of FIG. 5 is used to synchronize mutex M.

Figure 4:
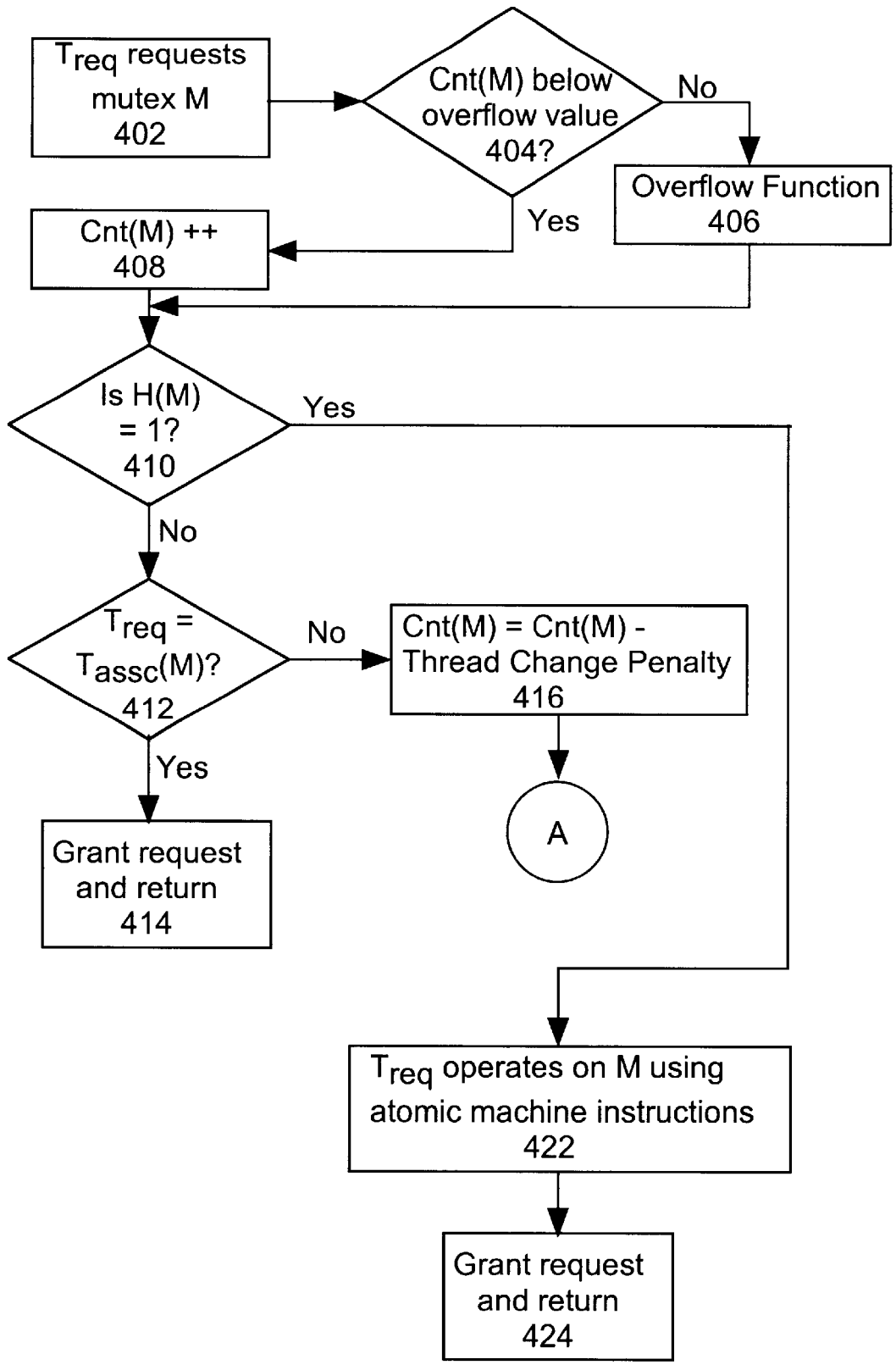
FIG. 4 is a flow chart of a method for acquiring a target mutex, which includes a mutex request counter, in accordance with another embodiment of the present invention.

Yet another embodiment of the present invention is shown in° FIG. 4. In FIG. 4, when a requesting thread, Treq, makes a request to acquire mutex M (402), a request counter, Cnt(M), which is stored in mutex M, is queried to determine if the value of the counter is below a predefined overflow value. If Cnt(M) is not below the overflow value, (404-No), then an overflow function is performed to reset it (406). Overflow function 406 requires an expensive hardware atomic sequence. Therefore, a sufficient number of bits are provided in M so that an overflow occurs at most once every few hundred mutex acquisitions. If Cnt(M) is, in fact, below the overflow value, (404-Yes), then the counter is incremented (408). The mutex synchronization bit of mutex M, H(M), is queried to determine whether mutex synchronization method 0 or 1 should be used to synchronize M (410). When H(M)=1, (410-Yes), atomic machine instructions are used to synchronize mutex M (422) before granting and returning the request to acquire mutex M (424). When H(M)=0 (410-No), synchronization method 0 is used to synchronize mutex M. In this embodiment, synchronization method 0 comprises the following steps. First, a determination is made as to whether Treq is associated with mutex M (412). When Treq is associated with mutex M (412-Yes), the request to acquire mutex M is granted and returns (414). When Treq is not associated with mutex M, (412-No), counter Cnt(M) is decremented by a thread change penalty (416). In a preferred embodiment, the thread change penalty is a constant number that is chosen to reflect the cost of changing the thread associated with mutex M versus the cost of using the expensive atomic hardware synchronization method. When Treq does not equal Tassc (412-No), the heuristic method of FIG. 5 is used to synchronize mutex M.

In some embodiments of the present invention, when $T_{req}$ requests acquisition of a mutex M having H(M)=0, but $T_{req}$ is not $T_{assc}$, (340-No or 412-No), a heuristic determination is made as to whether H(M) should remain 0. A preferred procedure used to implement the heuristic determination is shown in FIG. 5. In FIG. 5, $T_{req}$ acquires a supervisor mutex S(M) (500). S(M) is always acquired and released by $T_{req}$ using atomic machine instructions, and the identity of S(M) is fixed for the lifetime of mutex M. When $T_{req}$ has S(M) and H(M) remains 0 (502-Yes), $T_{req}$ suspends $T_{assc}(M)$ (504). When H(M) does not remain 0 (502-No), atomic machine instructions are used to synchronize mutex M (524), S(M) is released (528) and the request to acquire mutex M is granted and returns (530).

It will be appreciated that the supervisor mutex, S(M), could be implemented as single global mutex. However, such an implementation may lead to contention for the supervisor mutex as multiple threads attempt to acquire it. Thus, in a preferred embodiment, a supervisor mutex S is allocated for each mutex M to which the invention is applied. In other embodiments, the number of supervisor mutexes may be reduced by assigning supervisor mutexes to target mutex M from a pool of supervisor mutexes. Such an assignment may be made by hashing the address, or other unique identifier, of mutex M.

When $T_{req}$ has suspended $T_{assc}(M)$ (504), a determination is made as to whether $T_{assc}(M)$ was suspended while using fast load/store sequences (506). Such a determination can be made by pattern matching on the instructions, or by comparing the program control of $T_{assc}(M)$ with the known positions of fast load/store sequences in $T_{assc}(M)$. If $T_{assc}(M)$ was in a fast load/store sequence when $T_{assc}(M)$ was suspended (506-Yes), a resolve operation is used to push the $T_{assc}(M)$ program control out of the sequence (508). One of skill in the art will appreciate that resolve operation 508 may be accomplished by any one of a variety of techniques. For example, the $T_{assc}(M)$ program control may be reset to the start of the sequence, its state may be advanced out of the sequence by an interpreter, or $T_{assc}(M)$ may be resumed for a period of time and resuspended.

When $T_{assc}(M)$ was not suspended while using fast load/store sequences (506-No) or $T_{assc}(M)$ has been moved out of the load store sequence (508), a heuristic function is used to determine whether to set H(M) to 1 or to assign $T_{req}$ as the thread associated with M. Any possible heuristic function that attempts to predict when it would be advantageous to synchronize M using atomic machine instructions, as opposed to nonatomic synchronization sequences, is encompassed by the present invention. When the heuristic function has been called by an embodiment that includes a mutex request counter such as Cnt(M) of FIG. 4, the heuristic function may be expressed as:

If (Cnt(M) < threshold){

H(M) = 1;

} else {

$T_{assc} = T_{req}$;

}

The threshold value for the heuristic function in one embodiment is zero. In that embodiment, Cnt(M) is initialized to value equal to the Thread Change Penalty (discussed below), and the Thread Change Penalty is set equal to a value, such as 256, that reflects the relative cost of a change in a mutex's associated thread as compared to acquiring a mutex already associated with the requesting thread. In other embodiments, the heuristic function may require that H(M) be set to 1 when the recursive overflow bit associated with mutex M has been set.

In some embodiments, a heuristic function may ask what percentage of mutexes, which were created at a specified call site, have been converted to synchronization method 1. When the conversion percentage rises above a set value, such as ten percent, the heuristic function may require that H(M) be set to 1 in newly created mutexes. In yet another embodiment, a global counter (124 FIG. 1) that tracks the overall percentage of existing mutexes that have been set to synchronization method 0 may be used by the heuristic function. When such a global value rises above a predetermined amount, the heuristic function may require that H(M) be set to 1 in newly created mutexes.

After heuristic function 510 is executed, the value of H(M) is queried (512). When H(M)=1 (512-Yes), atomic machine instructions are used to synchronize mutex M (514). In the embodiment shown in FIG. 5, when atomic machine instructions 514 have been executed or when H(M)=0 (512-No), $T_{assc}(M)$ is resumed (516), S(M) is released (518), and the request to acquire mutex M is granted and returns (530). However, it will be appreciated that steps 516, 518, and 530 may be executed at any time after step 510 has been executed.

To avoid any attempt by Tassc(M) and Treq to suspend each other simultaneously, perhaps because their roles are reversed in an operation on a different mutex M, a control mutex may be assigned to each thread in some embodiments of the present invention. In such embodiments, Treq may be required to hold its own control mutex in addition to that of Tassc(M) before it suspends Tassc(M). When Treq owns its own mutex and has acquired that of Tassc(M) there is no danger that Tassc(M) will suspend Treq. It will be appreciated that when such control mutexes are used to avoid contention, Treq must acquire its own control mutex and the control mutex of Tassc(M) in a predetermined order. For example, it may be required that the control mutex that has a lower address be acquired by Treq first.

Although not shown in FIGS. 2–5, in some embodiments, it is possible to switch H(M) back to 0 after H(M) has been set to 1. It will be appreciated that providing the option to switch H(M) back from synchronization method 1 to method 0 will add overhead to the H(M)=1 instruction sequence. The amount of overhead added will depend on the nature of the atomic instructions that are available on the machine used. In some embodiments, it is preferable to make the H(M)=1 synchronization sequence as fast as possible. Therefore, in such embodiments, no possibility to switch back from H(M)=1 to H(M)=0 is provided and mutexes are initialized in the H(M)=0 state.

Avoiding Thread Identifiers

Steps 212 and 240 (FIG. 2), 340 (FIG. 3) and 412 (FIG. 4) require a requesting thread to know its thread identifier so as to be able to compare its thread identifier with the thread identifier of $T_{assc}(M)$. In some systems, however, threads do not have direct access to their thread identifiers, and the procedure calls that allow threads such as $T_{req}$ and $T_{assc}(M)$ to determine their own thread identifiers require several CPU cycles. In such systems, excessive thread identifier calls may be avoided by identifying threads by their stack pointer, i.e. "SP(T)." Thus, the comparative operations 212 and 240 in FIG. 2, 340 in FIG. 3, and 412 in FIG. 4 may involve a comparison of the stack pointer of $T_{req}$, i.e. "SP($T_{req}$)," to the stack pointer associated with mutex M, i.e. "SP(M)." As used herein, SP(M) is a stored stack pointer that represents SP($T_{assc}(M)$) at some time t. Usage of stack pointers as substitutes for thread identifiers presents special problems, however. For instance, the value of SP($T_{assc}(M)$) varies with time, so comparisons between SP($T_{req}$) and SP(M) may not agree when SP($T_{assc}(M)$) has varied at some point after time t. Because of this it is possible for SP($T_{req}$) to not equal SP(M) even if $T_{req}$ actually is $T_{assc}(M)$. To solve this problem, a simple hardware atomic update sequence may be executed when SP($T_{req}$) does not equal SP(M), in order to update SP(M) with the current value of SP($T_{assc}(M)$). Then, a comparison of SP($T_{req}$) to the updated SP(M) will determine whether $T_{req}$ is $T_{assc}(M)$. While there is a cost associated with updating SP(M), it is cheaper to update SP(M) occasionally than to acquire a supervisor matrix or synchronize using atomic machine instructions on all mutex operations. Some embodiments of the present invention avoid excessive updates of SP(M) by choosing a stack block size of B and rounding all stack pointer values to this block size before comparing SP($T_{req}$) to SP(M).

When stack block numbers are used to identify threads, it is preferable to guarantee that no two active threads have part of their stack in the same naturally-aligned block of size B. When this condition cannot be guaranteed for any thread, all threads are assigned small integer thread identifiers that do not conflict with existing stack block numbers, and subsequently these identifiers are stored in mutexes in place of stack block numbers. The stack block numbers and the thread identifiers must not conflict because the stack block numbers will continue to be stored in mutexes created before the switch to using thread identifiers until the thread associated with those mutexes is changed.

Another problem introduced by the use of stack values to identify threads is that it is necessary to map from SP(M) back to thread $T_{assc}$(M) in order to suspend the thread. Such a mapping may be done by any conventional method. For example, a balanced binary tree may be used to map stack regions back to thread identifiers. The tree (132 FIG. 1) allows queries on ranges. A balanced tree is desirable to avoid degenerate trees.

Mutex Structure

Figure 6A:
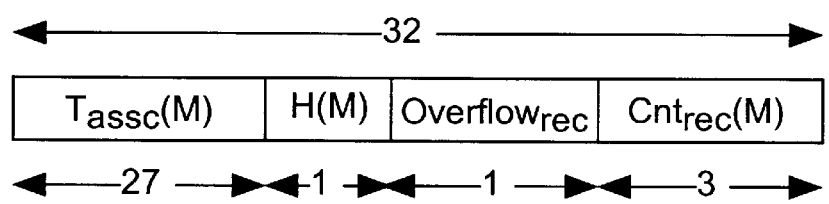
FIGS. 6A and 6B depict mutex data structures in accordance with various embodiments of the present invention.
Figure 6B:
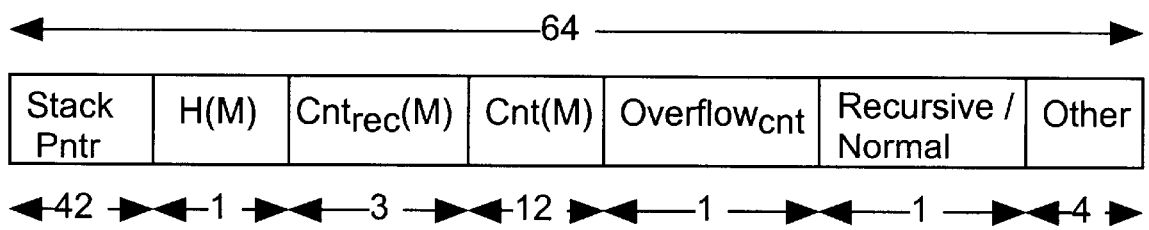

FIGS. 6A and 6B show two mutexes that are in accordance with the present invention. FIG. 6A shows a preferred 32 bit mutex of the present invention in which 27 bits are used to designate the thread associated with the mutex, $T_{assc}$(M), one bit is used to designate the synchronization protocol to be used to synchronize the mutex, H(M), one bit is used to record a recursion counter overflow condition, Overflow$_{rec}$, and three bits are used as a recursive request counter, $Cnt_{rec}$(M). When the value stored by $Cnt_{rec}$(M) exceeds 6, the format of the mutex is changed. Additional space is added to the recursion count and the value is used to indicate that extra storage space is being used by this mutex.

FIG. 6B shows a preferred 64 bit mutex of the present invention in which 42 bits are used to designate a stack pointer ID that contains the identifier of the associated thread, Stack Pntr, one bit is used to designate the synchronization protocol to be used to synchronize the mutex, H(M), three bits are used as a recursive request counter, $Cnt_{rec}$(M), twelve bits are used as a mutex request counter, Cnt(M), one bit is used to record a mutex request counter overflow condition, Overflow$_{rec}$, one bit is used to designate whether the mutex is recursive or normal, and four bits are used to store values that provide mutex compatibility with various operating systems and/or programming environments. In the embodiment depicted in FIG. 6B, when the value stored by $Cnt_{rec}$(M) exceeds four, H(M) is set to 1 and the bits used by Cnt(M) are used for the recursion count. This is possible because H(M) is never set to 0 in this embodiment after it has been set to 1.

Alternative Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, in some embodiments, Cnt(M) could be advanced at any logical location rather than in the sequence illustrated in FIG. 4. In a preferred embodiment, in fact, Cnt(M) is advanced only if H(M) is 0 after heuristic function 510.

In some embodiments of the present invention, mutexes M can only be in the state H(M)=0. That is, no option is provided to synchronize the mutexes using conventional atomic hardware operations (H(M)=1). In such embodiments, one of skill in the art will appreciate that the concepts illustrated in FIGS. 2–5 may still be practiced, although steps that query the state H(M) of a target mutex M are no longer necessary in such embodiments.

What is claimed is:

1. A method for controlling a request from a requesting thread to acquire a target mutex, said target mutex capable of specifying a first synchronization mode, a second synchronization mode, and a thread associated with said target mutex, the method comprising the steps of:

determining whether said target mutex is in said first synchronization mode or said second synchronization mode; and
  (a) when said target mutex is in said first synchronization mode, said method additionally comprises querying whether said requesting thread is the thread associated with said target mutex; wherein:
    (i) when said requesting thread is the thread associated with said target mutex, said request to acquire said target mutex is granted without using atomic machine instructions to assure that no thread is operating on said target mutex; and
    (ii) when said requesting thread is not the thread associated with said target mutex, said method additionally includes executing a verification procedure that ensures that no thread is operating on said target mutex; and
  (b) when said target mutex is in said second synchronization mode, said method additionally comprises the steps of:
    assuring, with atomic machine instructions, that no thread is operating on said target mutex; and
    granting said request to acquire said target mutex;
wherein said thread associated with said target mutex is associated with said target mutex even when said target mutex is not held by any thread.

2. The method of claim 1, wherein executing said verification procedure includes:

placing said target mutex in said second synchronization mode;

ensuring, with atomic machine instructions, that no thread is operating on said target mutex; and granting said request to acquire said target mutex.

3. The method of claim 1, wherein executing said verification procedure includes:

acquiring a supervisor mutex;

suspending the thread associated with said target mutex;

resolving whether said suspended thread is in a sequence operating on said target mutex;

choosing, based on a heuristic function, to (i), set said target mutex to said second synchronization mode or to (ii), associate said requesting thread with said target mutex;

determining whether said target mutex is in said first synchronization modeor said second synchronization mode, wherein, when said target mutex is in said second synchronization mode, said method additionally comprises a step of assuring, with atomic machine instructions, that no thread is operating on said target mutex;

resuming said thread associated with said target mutex;

releasing said supervisor mutex; and granting said request to acquire said target mutex.

4. The method of claim 3, wherein the suspending step comprises:

(i) requiring that said requesting thread own a control mutex associated with said requesting thread;
  (ii) requiring that said thread associated with said target mutex own a control mutex associated with said thread; and
  (iii) suspending said thread associated with said target mutex when said requesting thread does own both said control mutex of said requesting thread and said control mutex of said thread associated with said target mutex.

5. The method of claim 3, wherein when, in the resolving step, it is determined that said thread associated with said target mutex is in a target mutex operating sequence, said requesting thread executes a procedure selected from the group consisting of
  (i) backing said thread associated with said target mutex out of said target mutex operating sequence,
  (ii) pushing said thread associated with said target mutex out of said target mutex operating sequence, and
  (iii) an operation comprising the steps of:
    (1) resuming said thread associated with said target mutex for a period of time;
    (2) suspending said thread associated with said target mutex;
    (3) determining whether said suspended thread associated with said target mutex is in said target mutex operating sequence; and
    (4) repeating steps 1, 2 and 3 when said suspended thread associated with said target mutex is in said target mutex operation sequence.

6. The method of claim 3, wherein said heuristic function includes testing at least one value selected from the group consisting of:
  (i) a setting of a recursive overflow bit associated with said target mutex; and
  (ii) a conversion value, which represents a percentage of mutexes created by a particular call state, that are in said second synchronization mode.

7. The method of claim 1, wherein said target mutex includes a mutex request counter, the method further comprising the steps of:
  incrementing said mutex request counter when said mutex request counter is below a predefined overflow value; and
  performing an overflow function on said mutex request counter when said mutex request counter exceeds said overflow value; and
  said verification procedure of step a(ii) comprises:
    decrementing said mutex request counter by a thread penalty amount; acquiring a supervisor mutex;
    suspending the thread associated with said target mutex;
    resolving whether said suspended thread is in a sequence operating on said target mutex;
    choosing, based on a heuristic function, to (i), set said target mutex to said second synchronization modeor to (ii), associate said requesting thread with said target mutex;
    determining whether said target mutex is in said first synchronization modeor said second synchronization mode, wherein, when said target mutex is in said second synchronization mode, said method additionally comprises a step of assuring, with atomic machine instructions, that no thread is operating on said target mutex;
    resuming said thread associated with said target mutex; releasing said supervisor mutex; and
    granting said request to acquire said target mutex.

8. The method of claim 7, wherein said step of performing the mutex request counter overflow function comprises setting said mutex request counter to a number that is determined by a calculation selected from the group consisting of:
  dividing said mutex request counter by a number greater than one; and
  setting said mutex request counter to a predetermined constant.

9. The method of claim 7, wherein the suspending step comprises:
  (i) requiring that said requesting thread own a control mutex associated with said requesting thread;
  (ii) requiring that said thread associated with said target mutex own a control mutex associated with said thread; and
  (iii) suspending said thread associated with said target mutex when said requesting thread does own both said control mutex of said requesting thread and said control mutex of said thread associated with said target mutex.

10. The method of claim 7, wherein when, in the resolving step, it is determined that said thread associated with said target mutex is in a target mutex operating sequence, said requesting thread executes a procedure selected from the group consisting of
  (i) backing said thread associated with said target mutex out of said target mutex operating sequence,
  (ii) pushing said thread associated with said target mutex out of said target mutex operating sequence, and
  (iii) an operation comprising the steps of:
    (1) resuming said thread associated with said target mutex for a period of time;
    (2) suspending said thread associated with said target mutex;
    (3) determining whether said suspended thread associated with said target mutex is in said target mutex operating sequence; and
    (4) repeating steps 1, 2 and 3 when said suspended thread associated with said target mutex is in said target mutex operation sequence.

11. The method of claim 7, wherein said heuristic function includes testing at least one value selected from the group consisting of:
  (i) a setting of a recursive overflow bit associated with said target mutex; and
  (ii) a conversion value, which represents a percentage of mutexes created by a particular call state, that are in said second synchronization mode.

12. The method of claim 1, wherein said target mutex includes a mutex request counter, the method further comprising the steps of:
  incrementing said mutex request counter when said mutex request counter is below a predefined overflow value; and
  performing an overflow function on said mutex request counter when said mutex request counter exceeds said overflow value; and
  said verification procedure of step a(ii) comprises:
    decrementing said mutex request counter by a thread penalty amount; acquiring a supervisor mutex;
    suspending the thread associated with said target mutex;
    resolving whether said suspended thread is in a sequence operating on said target mutex;
    associating said requesting thread with said target mutex; and
    granting said request to acquire said target mutex.

13. The method of claim 12, wherein said step of performing the mutex request counter overflow function comprises setting said mutex request counter to a number that is determined by a calculation selected from the group consisting of:

dividing said mutex request counter by a number greater than one; and setting said mutex request counter to a predetermined constant.

14. The method of claim 12, wherein the suspending step comprises:
    (i) requiring that said requesting thread own a control mutex associated with said requesting thread;
    (ii) requiring that said thread associated with said target mutex own a control mutex associated with said thread; and
    (iii) suspending said thread associated with said target mutex when said requesting thread does own both said control mutex of said requesting thread and said control mutex of said thread associated with said target mutex.

15. The method of claim 12, wherein when, in the resolving step, it is determined that said thread associated with said target mutex is in a target mutex operating sequence, said requesting thread executes a procedure selected from the group consisting of
    (i) backing said thread associated with said target mutex out of said target mutex operating sequence,
    (ii) pushing said thread associated with said target mutex out of said target mutex operating sequence, and
    (iii) an operation comprising the steps of:
        (1) resuming said thread associated with said target mutex for a period of time;
        (2) suspending said thread associated with said target mutex;
        (3) determining whether said suspended thread associated with said target mutex is in said target mutex operating sequence; and
        (4) repeating steps 1, 2 and 3 when said suspended thread associated with said target mutex is in said target mutex operation sequence.

16. A computer program product for use in conjunction with a computer system, the computer program product comprising a computer readable storage medium and a computer program mechanism embedded therein, the computer program mechanism comprising:
    a mutex control procedure for controlling a request from a requesting thread to acquire a target mutex, said target mutex capable of specifying a first synchronization mode, a second synchronization mode, and a thread that is associated with said target mutex even when the target mutex is not held by any thread, the mutex control procedure including instructions for:
    receiving a request to acquire said target mutex from a requesting thread;
        (a) when said target mutex is in said first synchronization mode, and wherein:
            (i) when said requesting thread is the thread associated with said target mutex, said request to acquire said target mutex is granted without using atomic instructions to assure that no thread is operating on said target mutex; and
            (ii) when said requesting thread is not the thread associated with said target mutex, verging that no thread is operating on said target mutex; (b) when said target mutex is in said second synchronization mode, assuring, with atomic machine instructions, that no thread is operating on said target mutex; and granting said request to acquire said target mutex.

17. The computer program product of claim 16, wherein the instructions for verifying that no thread is operating on said target mutex include instructions for:

placing said target mutex in said second synchronization mode;

ensuring, with atomic machine instructions, that no thread is operating on said target mutex; and granting said request to acquire said target mutex.

18. The computer program product of claim 16, wherein the instructions for verifying that no thread is operating on said target mutex include instructions for:

acquiring a supervisor mutex;

suspending the thread associated with said target mutex;

resolving whether said suspended thread is in a sequence operating on said target mutex;

choosing, based on a heuristic function, to (i) set said target mutex to said second synchronization modeor to (ii), associate said requesting thread with said target mutex;

determining whether said target mutex is in said first synchronization modeor said second synchronization mode, and when said target mutex is in said second synchronization mode, assuring, with atomic machine instructions, that no thread is operating on said target mutex;

resuming said thread associated with said target mutex; releasing said supervisor mutex; and granting said request to acquire said target mutex.

19. The computer product of claim 18, wherein the instructions for suspending the thread associated with said target mutex comprises instructions for:
    (i) requiring that said requesting thread own a control mutex associated with said requesting thread;
    (ii) requiring that said thread associated with said target mutex own a control mutex associated with said thread; and
    (iii) suspending said thread associated with said target mutex when said requesting thread does own both said control mutex of said requesting thread and said control mutex of said thread associated with said target mutex.

20. The computer product of claim 18, further including a procedure, to be executed when the resolving instructions determine that said thread associated with said target mutex is in a target mutex operating sequence, the procedure selected from the group consisting of:
    (i) a procedure for backing said thread associated with said target mutex out of said target mutex operating sequence,
    (ii) a procedure for pushing said thread associated with said target mutex out of said target mutex operating sequence, and (iii) a procedure for:
        (1) resuming said thread associated with said target mutex for a period of time;
        (2) suspending said thread associated with said target mutex;
        (3) determining whether said suspended thread associated with said target mutex is in said target mutex operating sequence; and
        (4) repeating steps 1, 2 and 3 when said suspended thread associated with said target mutex is in said target mutex operation sequence.

21. The computer program product of claim 16, wherein said target mutex includes a mutex request counter, and the mutex control procedure further includes instructions for:

incrementing said mutex request counter when said mutex request counter is below a predefined overflow value; and performing an overflow function on said mutex request counter when said mutex request counter exceeds said overflow value; and verifying that no thread is operating on said target mutex, the instructions for verifying including instructions for:
  decrementing said mutex request counter by a thread penalty amount; acquiring a supervisor mutex;
  suspending the thread associated with said target mutex;
  resolving whether said suspended thread is in a sequence operating on said target mutex;
  choosing, based on a heuristic function, to (i), set said target mutex to said second synchronization mode or to (ii), associate said requesting thread with said target mutex;
  determining whether said target mutex is in said first synchronization modeor said second synchronization mode, and when said target mutex is in said second synchronization mode, assuring, with atomic machine instructions, that no thread is operating on said target mutex;
  resuming said thread associated with said target mutex; releasing said supervisor mutex; and
  granting said request to acquire said target mutex.

22. The computer product of claim 21, wherein said mutex request counter overflow function comprises instructions for setting said mutex request counter to a number that is determined by a calculation selected from the group consisting of:
  dividing said mutex request counter by a number greater than one; and
  setting said mutex request counter to a predetermined constant.

23. The computer product of claim 21, wherein the instructions for suspending the thread associated with said target mutex comprises instructions for:
  (i) requiring that said requesting thread own a control mutex associated with said requesting thread;
  (ii) requiring that said thread associated with said target mutex own a control mutex associated with said thread; and
  (iii) suspending said thread associated with said target mutex when said requesting thread does own both said control mutex of said requesting thread and said control mutex of said thread associated with said target mutex.

24. The computer product of claim 21, further including a procedure, to be executed when the resolving instructions determine that said thread associated with said target mutex is in a target mutex operating sequence, the procedure selected from the group consisting of:
  (i) a procedure for backing said thread associated with said target mutex out of said target mutex operating sequence,
  (ii) a procedure for pushing said thread associated with said target mutex out of said target mutex operating sequence, and (iii) a procedure for:
    (1) resuming said thread associated with said target mutex for a period of time;
    (2) suspending said thread associated with said target mutex;
    (3) determining whether said suspended thread associated with said target mutex is in said target mutex operating sequence; and
    (4) repeating steps 1, 2 and 3 when said suspended thread associated with said target mutex is in said target mutex operation sequence.

25. The computer product of claim 21, wherein said heuristic function includes instructions for testing at least one value selected from the group consisting of:
  (i) a setting of a recursive overflow bit associated with said target mutex; and
  (ii) a conversion value, which represents a percentage of mutexes created by a particular call state, that are in said second synchronization mode.

26. The computer program product of claim 16, wherein said target mutex includes a mutex request counter, and the mutex control procedure further includes instructions for:
  incrementing said mutex request counter when said mutex request counter is below a predefined overflow value; and
  performing an overflow function on said mutex request counter when said mutex request counter exceeds said overflow value; and
  verifying tat no thread is operating on said target mutex the instructions for verifying including instructions for:
    decrementing said mutex request counter by a thread penalty amount; acquiring a supervisor mutex;
    suspending the thread associated with said target mutex;
    resolving whether said suspended thread is in a sequence operating on said target mutex;
    associating said requesting thread with said target mutex; and granting said request to acquire said target mutex.

27. The computer product of claim 26, wherein said mutex request counter overflow function comprises instructions for setting said mutex request counter to a number that is determined by a calculation selected from the group consisting of:
  dividing said mutex request counter by a number greater than one; and
  setting said mutex request counter to a predetermined constant.

28. The computer product of claim 26, wherein the instructions for suspending the thread associated with said target mutex comprise instructions for:
  (i) requiring that said requesting thread own a control mutex associated with said requesting thread;
  (ii) requiring that said thread associated with said target mutex own a control mutex associated with said thread; and
  (iii) suspending said thread associated with said target mutex when said requesting thread does own both said control mutex of said requesting thread and said control mutex of said thread associated with said target mutex.

29. The computer product of claim 26, further including a procedure, to be executed when the resolving instructions determine that said thread associated with said target mutex is in a target mutex operating sequence, the procedure selected from the group consisting of:
  (i) a procedure for backing said thread associated with said target mutex out of said target mutex operating sequence,
  (ii) a procedure for pushing said thread associated with said target mutex out of said target mutex operating sequence, and
  (iii) a procedure for:
    (1) resuming said thread associated with said target mutex for a period of time;
    (2) suspending said thread associated with said target mutex;

(3) determining whether said suspended thread associated with said target mutex is in said target mutex operating sequence; and (4) repeating steps 1, 2 and 3 when said suspended thread associated with said target mutex is in said target mutex operation sequence.

30. The computer product of claim 26, wherein said heuristic function includes instructions for testing at least one value selected from the group consisting of:

(i) a setting of a recursive overflow bit associated with said target mutex; and (ii) a conversion value, which represents a percentage of mutexes created by a particular call state, that are in said second synchronization mode.

31. A computer system for controlling acquisition of a target mutex that is capable of specifying a first synchronization mode, a second synchronization mode, and a thread associated with said target mutex, the computer system comprising:

at least one central processing unit;

a memory;

at least one bus connecting the at least one central processing unit and the memory; and at least one thread, including a requesting thread;

the memory including a mutex controller and said target mutex; wherein said mutex controller includes instructions for:

determining, in response to a request to acquire said target mutex by said requesting thread, whether said target mutex is in said first synchronization modeor said second synchronization mode; and (a) when said target mutex is in said first synchronization mode, said mutex controller queries whether said requesting thread is the thread associated with said target mutex, and, in response to said query:

(i) grants said request to acquire said target mutex when said requesting thread is the thread associated with said target mutex without using atomic instructions to ensure that no other thread is holding said mutex; and (ii) performs a verification procedure that ensures that no thread is operating on said target mutex when said requesting thread is not the thread associated with said target mutex; and (b) when said target mutex is in said second synchronization mode, said mutex controller ensures, with atomic machine instructions, that no thread is operating on said target mutex and grants said request to acquire said target mutex;

wherein said thread associated with said target mutex is associated with said target mutex even when said target mutex is not held by any thread.

32. The computer system of claim 31, wherein said verification procedure includes instructions for:

placing said target mutex in said second synchronization mode;

ensuring, with atomic machine instructions, that no thread is operating on said target mutex; and granting said request to acquire said target mutex.

33. The computer system of claim 31, wherein said verification procedure comprises instructions for:

acquiring a supervisor mutex;

suspending the thread associated with said target mutex;

resolving whether said suspended thread is in a sequence operating on said target mutex;

choosing, based on a heuristic function, to (i), set said target mutex to said second synchronization mode or to (ii), associate said requesting thread with said target mutex;

determining whether said target mutex is in said first synchronization modeor said second synchronization mode, and, when said target mutex is in said second synchronization mode, assuring, with atomic machine instructions, that no thread is operating on said target mutex;

resuming said thread associated with said target mutex;

releasing said supervisor mutex; and granting said request to acquire said target mutex.

34. The computer product of claim 33, wherein said instructions for suspending the thread associated with said target mutex comprises instructions for:

(i) requiring that said requesting thread own a control mutex associated with said requesting thread;

(ii) requiring that said thread associated with said target mutex own a control mutex associated with said thread; and (iii) suspending said thread associated with said target mutex when said requesting thread does own both said control mutex of said requesting thread and said control mutex of said thread associated with said target mutex.

35. The computer product of claim 33, including a procedure to be executed when the resolving instructions determine that said thread associated with said target mutex is in a target mutex operating sequence, the procedure selected from the group consisting of:

(i) a procedure for backing said thread associated with said target mutex out of said target mutex operating sequence, (ii) a procedure for pushing said thread associated with said target mutex out of said target mutex operating sequence, and (iii) a procedure for:

(1) resuming said thread associated with said target mutex for a period of time;

(2) suspending said thread associated with said target mutex;

(3) determining whether said suspended thread associated with said target mutex is in said target mutex operating sequence; and (4) repeating steps 1, 2 and 3 when said suspended thread associated with said target mutex is in said target mutex operation sequence.

36. The computer product of claim 33, wherein said heuristic function includes instructions for testing at least one value selected from the group consisting of:

(i) a setting of a recursive overflow bit associated with said target mutex; and (ii) a conversion value, which represents a percentage of mutexes created by a particular call state, that are in said second synchronization mode.

37. The computer system of claim 31, wherein said target mutex includes a mutex request counter, the mutex controller further including instructions for:

incrementing said mutex request counter when said mutex request counter is below a predefined overflow value; and performing an overflow function on said mutex request counter when said mutex request counter exceeds said overflow value; and said verification procedure comprises instructions for:

decrementing said mutex request counter by a thread penalty amount;

acquiring a supervisor mutex;
suspending the thread associated with said target mutex;
resolving whether said suspended thread is in a sequence operating on said target mutex;
choosing, based on a heuristic function, to (i), set said target mutex to said second synchronization modeor to (ii), associate said requesting thread with said target mutex;
determining whether said target mutex is in said first synchronization modeor said second synchronization mode, and when said target mutex is in said second synchronization mode, assuring, with atomic machine instructions, that no thread is operating on said target mutex;
resuming said thread associated with said target mutex;
releasing said supervisor mutex; and
granting said request to acquire said target mutex.

38. The computer product of claim 37, wherein said mutex request counter overflow function comprises instructions for setting said mutex request counter to a number that is determined by a calculation selected from the group consisting of:
instructions for dividing said mutex request counter by a number greater than one; and
instructions for setting said mutex request counter to a predetermined constant.

39. The computer product of claim 37, wherein said instructions for suspending the thread associated with said target mutex comprises instructions for:
(i) requiring that said requesting thread own a control mutex associated with said requesting thread;
(ii) requiring that said thread associated with said target mutex own a control mutex associated with said thread; and
(iii) suspending said thread associated with said target mutex when said requesting thread does own both said control mutex of said requesting thread and said control mutex of said thread associated with said target mutex.

40. The computer product of claim 37, including a procedure to be executed when the resolving instructions determine that said thread associated with said target mutex is in a target mutex operating sequence, the procedure selected from the group consisting of:
(i) a procedure for backing said thread associated with said target mutex out of said target mutex operating sequence,
(ii) a procedure for pushing said thread associated with said target mutex out of said target mutex operating sequence, and
(iii) a procedure for:
  (1) resuming said thread associated with said target mutex for a period of time;
  (2) suspending said thread associated with said target mutex;
  (3) determining whether said suspended thread associated with said target mutex is in said target mutex operating sequence; and
  (4) repeating steps 1, 2 and 3 when said suspended thread associated with said target mutex is in said target mutex operation sequence.

41. The computer product of claim 37, wherein said heuristic function includes instructions for testing at least one value selected from the group consisting of:
(i) a setting of a recursive overflow bit associated with said target mutex; and (ii) a conversion value, which represents a percentage of mutexes created by a particular call state, that are in said second synchronization mode.

42. The computer system of claim 31, wherein said target mutex includes a mutex request counter, the mutex controller further including instructions for:
incrementing said mutex request counter when said mutex request counter is below a predefined overflow value; and
performing an overflow function oh said mutex request counter when said mutex request counter exceeds said overflow value; and
said verification procedure comprises instructions for:
decrementing said mutex request counter by a thread penalty amount;
acquiring a supervisor mutex;
suspending the thread associated with said target mutex;
resolving whether said suspended thread is in a sequence operating on said target mutex;
associating said requesting thread with said target mutex; and
granting said request to acquire said target mutex.

43. The computer product of claim 42, wherein said mutex request counter overflow function comprises instructions for setting said mutex request counter to a number that is determined by a calculation selected from the group consisting of:
instructions for dividing said mutex request counter by a number greater than one; and
instructions for setting said mutex request counter to a predetermined constant.

44. The computer product of claim 42, wherein said instructions for suspending the thread associated with said target mutex comprises instructions for:
(i) requiring that said requesting thread own a control mutex associated with said requesting thread;
(ii) requiring that said thread associated with said target mutex own a control mutex associated with said thread; and
(iii) suspending said thread associated with said target mutex when said requesting thread does own both said control mutex of said requesting thread and said control mutex of said thread associated with said target mutex.

45. The method of claim 42, including a procedure to be executed when the resolving instructions determine that said thread associated with said target mutex is in a target mutex operating sequence, the procedure selected from the group consisting of:
(i) a procedure for backing said thread associated with said target mutex out of said target mutex operating sequence,
(ii) a procedure for pushing said thread associated with said target mutex out of said target mutex operating sequence, and
(iii) a procedure for:
  (1) resuming said thread associated with said target mutex for a period of time;
  (2) suspending said thread associated with said target mutex;
  (3) determining whether said suspended thread associated with said target mutex is in said target mutex operating sequence; and
  (4) repeating steps 1, 2 and 3 when said suspended thread associated with said target mutex is in said target mutex operation sequence.

46. A method for controlling a request from a requesting thread to acquire a target mutex capable of specifying a thread associated with said target mutex, the method comprising the step of querying, without use of atomic machine instructions, whether said requesting thread is the thread associated with said target mutex, wherein:
  (i) when said requesting thread is the thread associated with said target mutex, said request to acquire said target mutex is granted, and
  (ii) when said requesting thread is not the thread associated with said target mutex, said method additionally includes executing a verification procedure that ensures that no thread is operating on said target mutex;
wherein said associated thread being associated with said target mutex even when no thread holds the target mutex.

47. A computer program product for use in conjunction with a computer system, the computer program product comprising a computer readable storage medium and a computer program mechanism embedded therein, the computer program mechanism comprising a mutex control procedure for controlling a request from a requesting thread to acquire a target mutex capable of specifying a thread associated with said target mutex, the mutex control procedure including instructions for:
  querying, without use of atomic machine instructions, whether said requesting thread is the thread associated with said target mutex;
  verifying that no thread is operating on said target mutex; and
  granting said request to acquire said target mutex;
  wherein said associated thread being associated with said target mutex even when no thread holds the target mutex.

48. A computer system for controlling acquisition of a target mutex capable of specifying a thread associated with said target mutex, the computer system comprising:
  at least one central processing unit;
  a memory;
  at least one bus connecting the at least one central processing unit and the memory; and
  at least one thread, including a requesting thread;
  the memory including a mutex controller and said target mutex;
  wherein said mutex controller includes instructions for:
    determining, in response to a request to acquire said target mutex by said requesting thread, whether said requesting thread is the thread associated with said target mutex, and, in response to said request:
      (i) granting said request to acquire said target mutex when said requesting thread is the thread associated with said target mutex; and
      (ii) performing a verification procedure that ensures that no thread is operating on said target mutex when said requesting thread is not the thread associated with said target mutex;
  wherein said associated thread being associated with said target mutex even when no thread holds the target mutex.

49. A computer system, comprising:
  a CPU; and
  memory coupled to said CPU, said memory storing a mutex usable to provide controlled access to a resource, said mutex programmed to specify one of a plurality of synchronization techniques related to using said mutex among multiple threads;
  wherein said CPU is adapted to program said mutex from one synchronization technique to another synchronization technique;
  wherein a thread is associated with the mutex even if no thread owns the mutex and wherein one of the synchronization techniques uses atomic operations and, when the associated thread requests the mutex, another synchronization does not use atomic operation.

* * * * *